US010038296B2

(12) United States Patent
Fukui et al.

(10) Patent No.: US 10,038,296 B2
(45) Date of Patent: Jul. 31, 2018

(54) LIGHT AMPLIFICATION DEVICE AND LASER PROCESSING DEVICE

(71) Applicant: OMRON CORPORATION, Kyoto-shi, Kyoto (JP)

(72) Inventors: Hiroshi Fukui, Kyoto (JP); Tadamasa Yokoi, Kusatsu (JP); Tatsuo Ogaki, Kusatsu (JP); Shuichi Tani, Kusatsu (JP); Tatsunori Sakamoto, Kusatsu (JP); Yuichi Ishizu, Kusatsu (JP)

(73) Assignee: OMRON CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/413,981

(22) Filed: Jan. 24, 2017

(65) Prior Publication Data

US 2017/0271835 A1    Sep. 21, 2017

(30) Foreign Application Priority Data

Mar. 15, 2016  (JP) ................................. 2016-050550

(51) Int. Cl.
*H01S 3/00* (2006.01)
*H01S 3/067* (2006.01)
*H01S 3/0941* (2006.01)

(52) U.S. Cl.
CPC .......... *H01S 3/067* (2013.01); *H01S 3/09415* (2013.01)

(58) Field of Classification Search
CPC .............................. H01S 3/09415; H01S 3/067
USPC ......................................................... 359/333
See application file for complete search history.

(56) References Cited

U.S. PATENT DOCUMENTS

| 5,982,790 | A  | * | 11/1999 | Grossman ................. H01S 3/13 372/10 |
| 2010/0183040 | A1 | * | 7/2010 | Ishizu ................. H01S 3/06754 372/25 |
| 2011/0019705 | A1 | * | 1/2011 | Adams ................. H01S 3/1301 372/25 |

(Continued)

FOREIGN PATENT DOCUMENTS

| EP | 2363927 A2 | 9/2011 |
| EP | 2528172 A2 | 11/2012 |
| EP | 2947728 A1 | 11/2015 |

(Continued)

OTHER PUBLICATIONS

Communication dated Jul. 13, 2017 from European Patent Office in counterpart application No. 17151401.1.

(Continued)

*Primary Examiner* — Mark Hellner
(74) *Attorney, Agent, or Firm* — Sughrue Mion, PLLC

(57) ABSTRACT

A light amplifier according to an aspect of the present invention includes: a seed light source configured to generate a pulsing seed light; an excitation light source configured to generate excitation light; a light amplifying fiber configured to amplify the seed light by the excitation light and output the amplified light; and a control unit configured to control the seed light source and the excitation light source. The control unit has a mode to control the excitation light's power such that as a set value of a pulse width of the amplified light increases, the amplified light's peak energy increases within a threshold value at a minimum set value of the pulse width.

12 Claims, 14 Drawing Sheets

(56) References Cited

U.S. PATENT DOCUMENTS

2012/0300288 A1   11/2012   Ogaki

FOREIGN PATENT DOCUMENTS

| JP | 2010171131 A1 | 8/2010 |
| JP | 2011-181761 A | 9/2011 |
| JP | 2012-248615 A | 12/2012 |

OTHER PUBLICATIONS

Korean Office Action; Application No. 10-2017-0000604; dated Feb. 20, 2018.

* cited by examiner

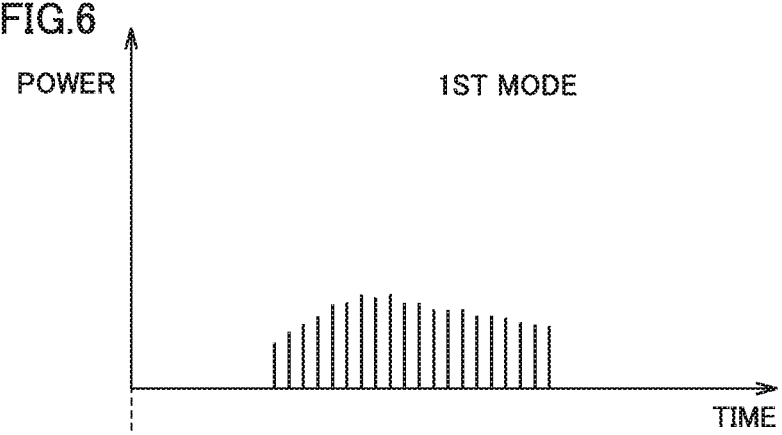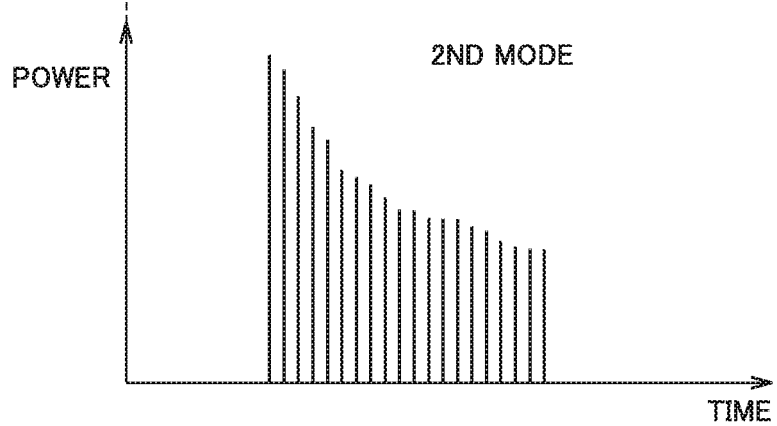

FIG.7

| 1ST MODE | | 2ND MODE | |
|---|---|---|---|
| PATTERN | NO. OF PULSES | PATTERN | NO. OF PULSES |
| 1 | 1 | 1 | 10 |
| 2 | 2 | 2 | 20 |
| 3 | 3 | 3 | 30 |
| 4 | 4 | | |
| 5 | 5 | | |
| 6 | 6 | | |
| 7 | 7 | | |
| 8 | 8 | | |
| 9 | 9 | | |
| 10 | 10 | | |
| 11 | 12 | | |
| 12 | 14 | | |
| 13 | 16 | | |
| 14 | 18 | | |
| 15 | 20 | | | dow
LIGHT AMPLIFICATION DEVICE AND LASER PROCESSING DEVICE

BACKGROUND OF THE INVENTION

Field of the Invention

The present invention relates to a light amplification device and a laser processing device. In particular, the present invention relates to a technique for emitting a laser pulse stably from a fiber amplifier of a MOPA (Master Oscillator and Power Amplifier) system.

Description of the Background Art

A laser processing device which adopts a MOPA (Master Oscillator and Power Amplifier) system using a light amplifying fiber and uses light from a laser diode (LD) as seed light, allows emitted light's repetition frequency, peak power, pulse width, etc. to be varied independently of each other, and thus characteristically allows an optimal parameter to be easily selected depending on a target to be processed. For example, Japanese Patent Laying-Open No. 2011-181761 discloses a configuration in which a driver is controlled to vary a condition of excitation light in a non emission period so that energy of pulsed light output from a laser processing device can be stabilized regardless of the non emission period's length.

Japanese Patent Laying-Open No. 2012-248615 discloses a light amplification device which operates in response to a value detected by a peak value detector to control power of excitation light (a driver's bias current) in a non light emission period so that the first output light pulse and the last output pulse generated during a light emission period are equal in power.

SUMMARY OF INVENTION

It has been difficult in a conventional laser processing device having a fiber laser oscillator to increase average power in a low frequency region of an oscillation period. This is because such a problem occurs as follows: When a frequency is decreased while excitation light's power is fixed, peak power increases. When peak power increases, the fiber may be damaged. Furthermore, when a nonlinear optical phenomenon exemplified by stimulated Raman scattering (SRS) is caused by the increased peak power, a transmission mode with a mismatched phase is enhanced.

In order to avoid the above described problem, when using the fiber laser oscillator at low frequency, it must be used in a state where average power is decreased by decreasing excitation light's power.

On the other hand, for example, when a processing, such as deep metal penetration or black marking, is done using laser light, the laser light is required to have large power of some extent. Accordingly, when processing a metal by laser light, a laser oscillator having a large average power has been used at a low frequency. A conventional fiber laser oscillator has been unable to increase its output's average power, and processing, such as deep metal penetration or black marking, has been difficult. Accordingly, a fiber laser oscillator capable of outputting light of high power for processing is required.

A light amplifier according to an aspect of the present invention comprises: a seed light source configured to generate a pulsing seed light; an excitation light source configured to generate excitation light; a light amplifying fiber configured to amplify the seed light by the excitation light and output the amplified light; and a control unit configured to control the seed light source and the excitation light source, the control unit having a mode to control the excitation light's power such that as a set value of a pulse width of the amplified light increases, the amplified light's peak energy increases within a threshold value at a minimum set value of the pulse width.

The above "mode" is a mode in which the excitation light has power increased when the pulse width is increased.

Preferably, when the mode is set, the control unit decreases an upper limit of a repetition frequency of the amplified light to be smaller than an upper limit of the repetition frequency in another mode different from the mode, and also sets the pulse width to be larger than the minimum set value. The control unit increases the power of the excitation light generated by the excitation light source to be larger than the power of the excitation light in the other mode.

"Another mode" is a mode in which the excitation light has power fixed while a parameter such as pulse width, repetition frequency, etc. is adjusted.

Preferably, the control unit increases an average power of the amplified light in the mode to be higher than the average power in the other mode.

Preferably, a maximum value of the pulse width in the mode is larger than that of the pulse width in the other mode.

Preferably, when the control unit increases the pulse width, the control unit controls the seed light source to emit the seed light as a pulse train including a plurality of light pulses.

Preferably, the control unit performs a process to cause a user to select a pattern for setting each of the mode and the other mode from a plurality of set patterns for determining a number of the light pulses configuring the pulse train.

Preferably, the control unit performs a process to cause a user to select a pattern for setting each of the mode and the other mode from a plurality of set patterns for determining the repetition frequency.

Preferably, the control unit switches the mode to the other mode and vice versa by a reboot process.

Preferably, when the mode is set from another mode different from the mode, the control unit operates in response to an input received from a user for decreasing an upper limit of the repetition frequency of the amplified light to increase the pulse width to be larger than that in the other mode and also increase the excitation light's power to be larger than that in the other mode.

Preferably, when the mode is set from another mode different from the mode, the control unit operates in response to an input received from a user for increasing the pulse width to increase the excitation light's power to be larger than the excitation light's power in the other mode and also decrease the repetition frequency's upper limit to be smaller than that in the other mode.

Preferably, when the mode is set from another mode different from the mode, the control unit operates in response to an input received from a user for increasing the excitation light's power to increase the pulse width to be larger than that in the other mode and also decrease the repetition frequency's upper limit to be smaller than that in the other mode.

A laser processing device according to another aspect of the present invention is a laser processing device comprising the light amplification device according to any of the above.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a waveform diagram showing an example of a waveform of a laser pulse when the laser processing device according to the present embodiment is operated in the first mode and the second mode.

FIG. 7 shows an example of a set pattern for operating the laser processing device according to the present embodiment in each of the first mode and the second mode.

DESCRIPTION OF THE PREFERRED EMBODIMENTS

The present invention will now be described in embodiments hereinafter in detail with reference to the drawings. Note that in the figures, identical or corresponding components are identically denoted, and accordingly, will not be described repeatedly.

<A. Device Configuration>

Figure 1:
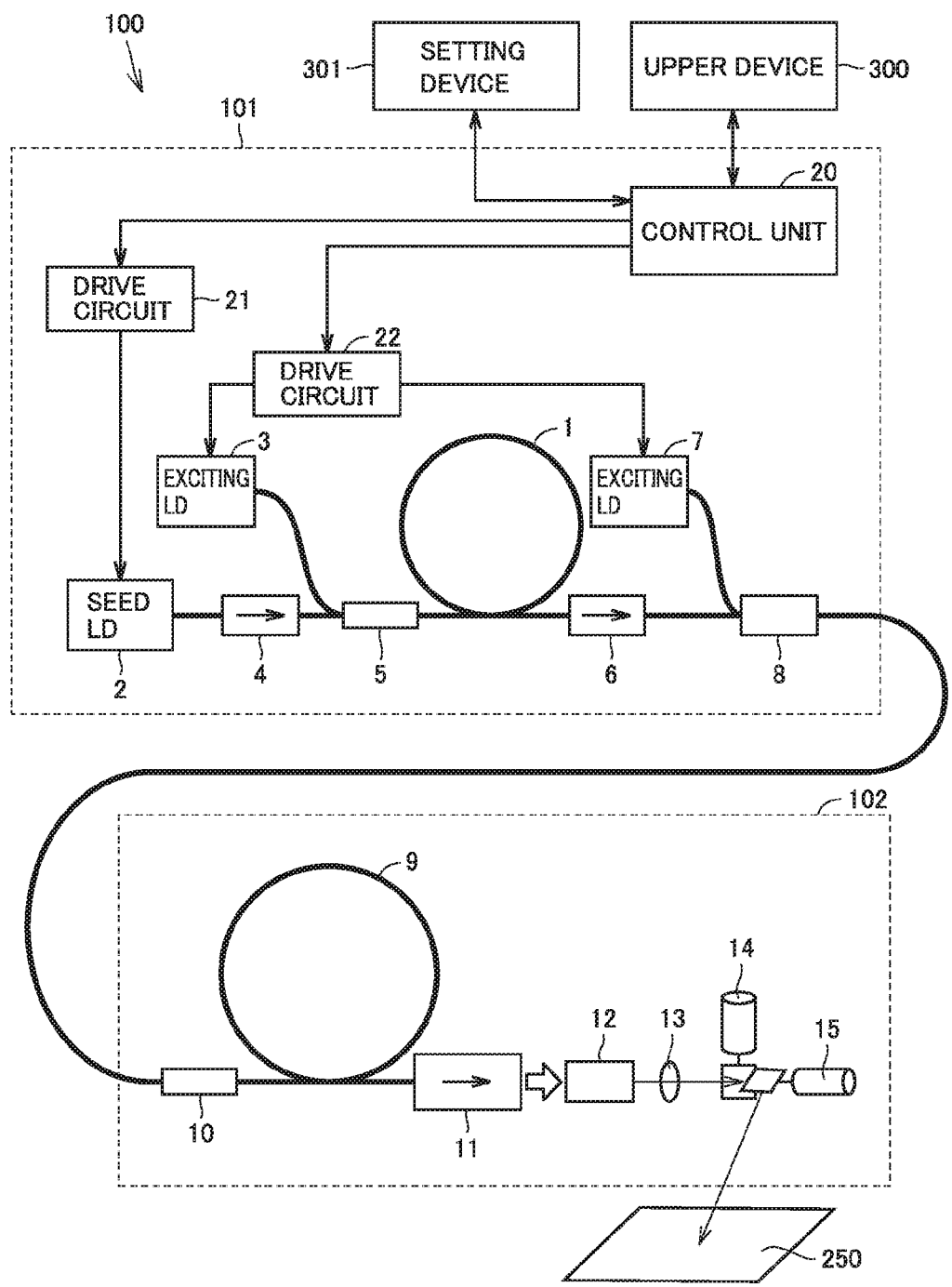
FIG. 1 shows a configuration example of a laser processing device according to a present embodiment.

Initially, a device configuration of a light amplification device according to an embodiment of the present invention and a laser processing device including the light amplification device will be described. FIG. 1 shows a configuration example of the laser processing device according to the present embodiment.

With reference to FIG. 1, a laser processing device 100 according to an embodiment of the present invention is implemented for example as a laser marker. Laser processing device 100 includes a controller 101 and a marker head 102. Controller 101 configures a main part of the light amplification device according to the embodiment of the present invention.

In this embodiment, the light amplification device emits laser light having an intensity periodically varying in a pulsing manner. Hereinafter, emitted light will also be referred to as a "laser pulse." In the following description, unless otherwise indicated, the "laser pulse" means laser light composed of one or more pulses. A maximum value in intensity (or power) of each pulse included in the "laser pulse" is generally referred to as "peak power." Typically, an envelope of a power that the "laser pulse" has corresponds to "peak power."

Typically, laser processing device 100 includes a fiber amplifier of a MOPA (Master Oscillator and Power Amplifier) system. In this embodiment, laser processing device 100 includes a fiber amplifier of two stages. More specifically, controller 101 includes a light amplifying fiber 1, a seed laser diode (LD) 2, exciting laser diodes 3 and 7, isolators 4 and 6, combiners 5 and 8, drive circuits 21 and 22, and a control unit 20. Marker head 102 includes a light amplifying fiber 9, an optical coupler 10, an isolator 11, a beam expander 12, a z axis scanning lens 13, and galvanoscanners 14 and 15. In the following description, a laser diode may simply be represented as an "LD."

Light amplifying fiber 1, seed LD 2, and exciting LD 3 are basic elements of the fiber amplifier of the MOPA system. Light amplifying fiber 1 includes a core with a rare-earth element added as a light amplifying component, and a clad provided around the core. Light amplifying fiber 9, as well as light amplifying fiber 1, includes a core with a rare-earth element added as a light amplifying component, and a clad provided around the core.

The type of rare-earth element added to the core of light amplifying fiber 1, 9 is not particularly limited and can be Yb (ytterbium), Er (erbium), and Nd (neodymium), for example. In the present embodiment, a case will be indicated as an example in which a light amplifying fiber with Yb added as a rare-earth element is used. Light amplifying fiber 1, 9 may be a single clad fiber with a single layer of clad provided around the core or a double clad fiber with two layers of clad provided around the core.

Light amplifying fiber 1 amplifies seed light that is received from seed LD 2 by excitation light that is received from exciting LD 3. In other words, in the fiber amplifier of the MOPA system, excitation light from exciting LD 3 and pulsing seed light from seed LD 2 are provided to light amplifying fiber 1. The excitation light having entered light amplifying fiber 1 is absorbed by the atoms of the rare-earth element contained in the core and the atoms are excited. When the seed light is propagated through the core of light amplifying fiber 1 with the atoms excited, the seed light causes stimulated emission of the excited atoms, and therefore, the seed light is amplified. That is, light amplifying fiber 1 amplifies the seed light by the excitation light.

Seed LD 2 is a laser light source and is a seed light source generating seed light. The seed light's wavelength is selected from a range from 1000 nm to 1100 nm, for example. Drive circuit 21 operates in response to a command received from control unit 20 to repeatedly apply a pulsed current to seed LD 2 to drive seed LD 2 in a pulsing manner. That is, seed LD 2 emits pulsed seed light.

The seed light emitted from seed LD 2 passes through isolator 4 and then enters light amplifying fiber 1. Isolator 4 has a function to pass light only in one direction and block light incident in the opposite direction. Isolator 4 passes the seed light from seed LD 2 while blocking return light returned from light amplifying fiber 1. This can prevent the return light from light amplifying fiber 1 from entering seed LD 2. This is done because if the return light from the light amplifying fiber 1 enters seed LD 2, it may damage seed LD 2.

Exciting LD 3 is a laser light source and it is an excitation light source generating excitation light for exciting atoms of the rare-earth element added to the core of light amplifying fiber 1. If Yb is added to the core of light amplifying fiber 1 as a rare earth element, the excitation light's wavelength is set for example to 915±10 nm, for example. Exciting LD 3 is driven by drive circuit 22.

The seed light from seed LD 2 and the excitation light from exciting LD 3 are combined together by combiner 5 and thus enter light amplifying fiber 1. When light amplifying fiber 1 is a single clad fiber, the seed light and the excitation light both enter the core. In contrast, when light amplifying fiber 1 is a double clad fiber, the seed light enters the core and the excitation light enters a first clad. The first clad of the double clad fiber functions as a waveguide for the excitation light. When the excitation light having entered the first clad is propagating through the first clad, the rare-earth element in the core is excited according to the mode in which the excitation light passes through the core.

Light amplifying fiber 1 amplifies laser light which in turn passes through isolator 6 and is then combined in combiner 8 with excitation light received from exciting LD 7. Exciting LD 7 generates excitation light for exciting atoms of the rare earth element added to the core of light amplifying fiber 9. Exciting LD 7 is driven by drive circuit 22.

Light amplifying fiber 9 is optically coupled with the fiber from controller 101 by optical coupler 10. The laser light amplified by light amplifying fiber 1 is further amplified inside light amplifying fiber 9 by excitation light received from exciting LD 7.

Light amplifying fiber 9 outputs laser light which in turn passes through isolator 11. Isolator 11 passes the laser light which has been amplified by light amplifying fiber 9 and is also emitted from light amplifying fiber 9, and isolator 11 also blocks laser light which returns to light amplifying fiber 9.

The laser light having passed through isolator 11 has its beam diameter expanded by beam expander 12. Z axis scanning lens 13 scans the laser light in a direction along the z axis (in other words, a vertical direction). Galvanoscanners 14 and 15 scan the laser light in a direction along the x axis and a direction along the y axis, respectively. Thus, the laser light is scanned in a two dimensional direction on a surface of a workpiece 250. Note that although not shown, other optical components, such as a fθ lens for condensing the laser light, may be included in marker head 102.

By scanning laser light, that is, a laser pulse received from the light amplification device, on a surface of workpiece 250 in a two dimensional direction, the surface of workpiece 250, which is formed of resin, metal, etc., is processed. For example, on the surface of workpiece 250, information which is composed of characters, graphics, etc. is printed (or marked).

In the present embodiment, the light amplification device is configured so that excitation light is enhanced in a first stage of amplification (light amplification in controller 101). However, it is not necessarily essential that marker head 102 perform light amplification. That is, marker head 102 may dispense with light amplifying fiber 9.

Control unit 20 mainly controls the generation of the light by seed LD 2 (a seed light source) and exciting LD 3 (an excitation light source). More specifically, control unit 20 receives from an upper device 300 a command required for scanning laser light. Furthermore, control unit 20 receives a setting from the user via a setting device 301. Control unit 20 operates in response to a user operation from setting device 301 to control drive circuits 21 and 22 and also control galvanoscanners 14 and 15.

Control unit 20 may be any hardware configured to provide a control command. For example, control unit 20 may be implemented using a computer which executes a prescribed program. As setting device 301, a personal computer can be used, for example. The personal computer can include a mouse, a keyboard, a touch panel, etc. as an input unit.

Optical elements, such as seed LD 2, exciting LDs 3 and 7, and isolators 4, 6, and 11 have characteristics which may vary depending on temperature. Accordingly, it is more preferable to provide laser processing device 100 with a temperature controller for maintaining these optical elements' temperature constantly.

Laser processing device 100 according to the present embodiment allows its average power, the laser pulse's repetition frequency, and the laser pulse's pulse width to be controlled independently of each other. The user can set an average power, a repetition frequency of the laser pulse, and a pulse width of the laser pulse independently of each other. As shown in FIG. 1, in the present embodiment, the light amplification device has a multi-stage amplification configuration, and accordingly, by increasing excitation light at each amplifying stage, laser light's average power can be increased within a range in which a nonlinear optical phenomenon does not occur.

The light amplification device (laser processing device 100) according to the present embodiment has two modes. In other words, control unit 20 has two control modes. A first mode is a mode in which excitation light has power fixed while a parameter such as pulse width, repetition frequency, etc. is adjusted. A second mode is a mode in which excitation light has power increased when a pulse width is increased. Note that the second mode corresponds to "a mode" in the present invention and its embodiment(s), and the first mode corresponds to "another mode" in the present invention and its embodiment(s).

<B. First Mode>

In the first mode, the laser pulse's repetition frequency and the laser pulse's pulse width can be set in a wide range.

Figure 2:
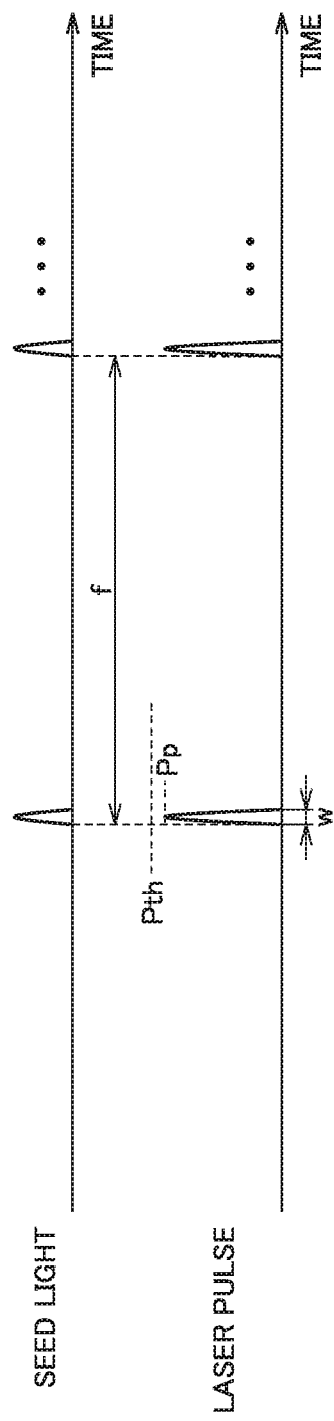
FIG. 2 is a waveform diagram for illustrating a laser pulse emitted by the laser processing device according to the present embodiment, that has a minimum pulse width.

FIG. 2 is a waveform diagram for illustrating a laser pulse emitted by laser processing device 100 according to the present embodiment, that has a minimum pulse width. With reference to FIG. 2, f represents the laser pulse's repetition frequency. w represents the laser pulse's pulse width. Average power can be defined as a sum of energy of laser pulses output per unit time (e.g., 1 second) from the light amplification device.

Pp represents the laser pulse's peak power. Peak power Pp is controlled not to exceed a threshold value power Pth. Threshold power Pth is previously determined to be the power of an upper limit which does not damage the light amplifying fiber for example.

Figure 3:
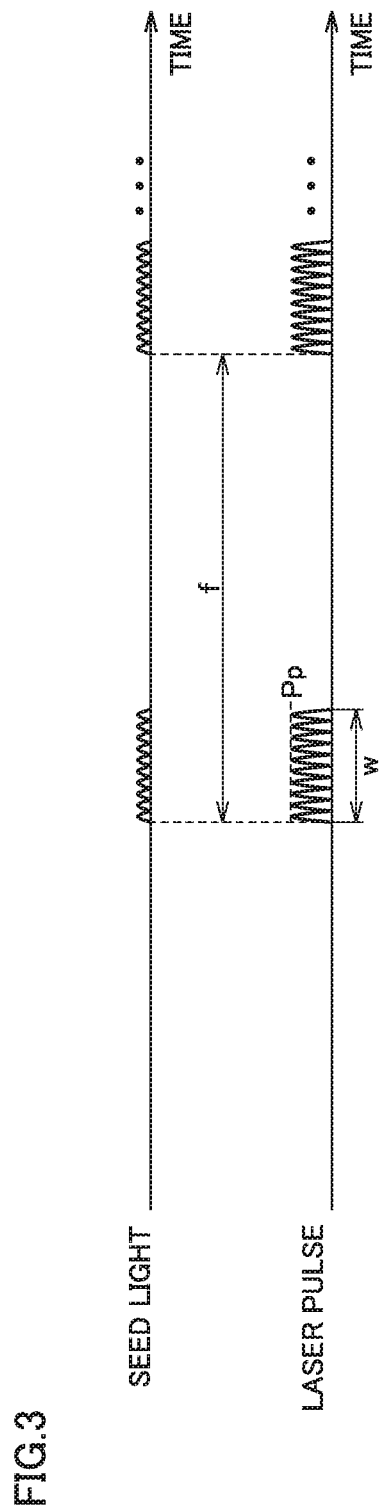
FIG. 3 is a waveform diagram for illustrating a laser pulse emitted by the laser processing device according to the present embodiment, that has a larger pulse width than the minimum pulse width.

FIG. 3 is a waveform diagram for illustrating a laser pulse emitted by laser processing device 100 according to the present embodiment, that has a larger pulse width than the minimum pulse width. With reference to FIG. 3, in the present embodiment, when pulse width w is increased, a single pulse's width is not increased; rather, a pulse train including a plurality of pulses is output. The single pulse's width is the same as the minimum pulse width. Accordingly, pulse width w is proportional to the number of pulses.

In the first mode, pulse width w has a minimum value of 15 ns, for example, and is variable between 15 ns and 300 ns. Furthermore, repetition frequency f is variable, for example within a range of 10 kHz to 1000 kHz.

Figure 4:
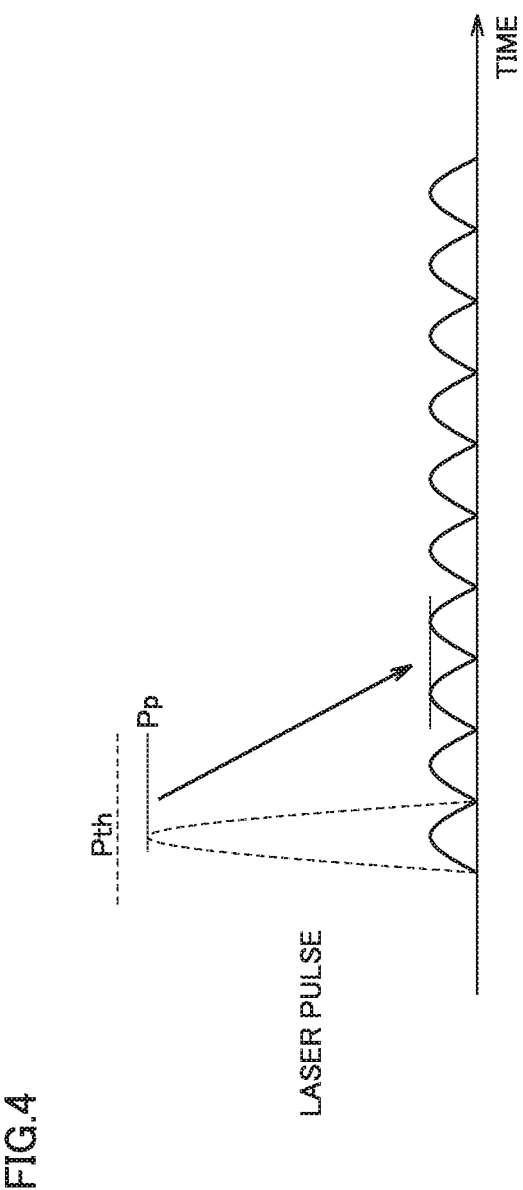
FIG. 4 is a waveform diagram for illustrating variation of peak power when the laser processing device according to the present embodiment increases a pulse width in a first mode.

FIG. 4 is a waveform diagram for illustrating variation of peak power Pp when laser processing device 100 according to the present embodiment increases a pulse width in the first mode. With reference to FIG. 4, when pulse width w is increased with the laser pulse's energy fixed, peak power Pp decreases.

For example, in metal processing (for example, deep metal penetration or black marking), it is necessary to make the laser pulse's energy higher. The laser processing device having the fiber laser oscillator must have an average power increased (for example to 50 W) and a repetition frequency decreased. By decreasing the repetition frequency, a time interval at which the laser pulse is output from the light amplifying fiber becomes long. As a period of time for which excitation light's power is accumulated in the light amplifying fiber becomes long, peak power Pp increases by decreasing repetition frequency f.

As the laser processing device having the fiber laser oscillator allows a repetition frequency, a peak power, a pulse width, etc. to be varied independently of each other, it is not easy to set a condition for generating a laser pulse required for a processing which requires high average power. Accordingly, in the present embodiment, laser processing device 100 has the second mode. The second mode is a mode allowing the laser pulse to be output with a higher average energy than the first mode.

<C. Second Mode>

In the second mode, a setting range of the repetition frequency and a setting range of the pulse width are determined so that the average power can be higher than in the first mode.

Figure 5:
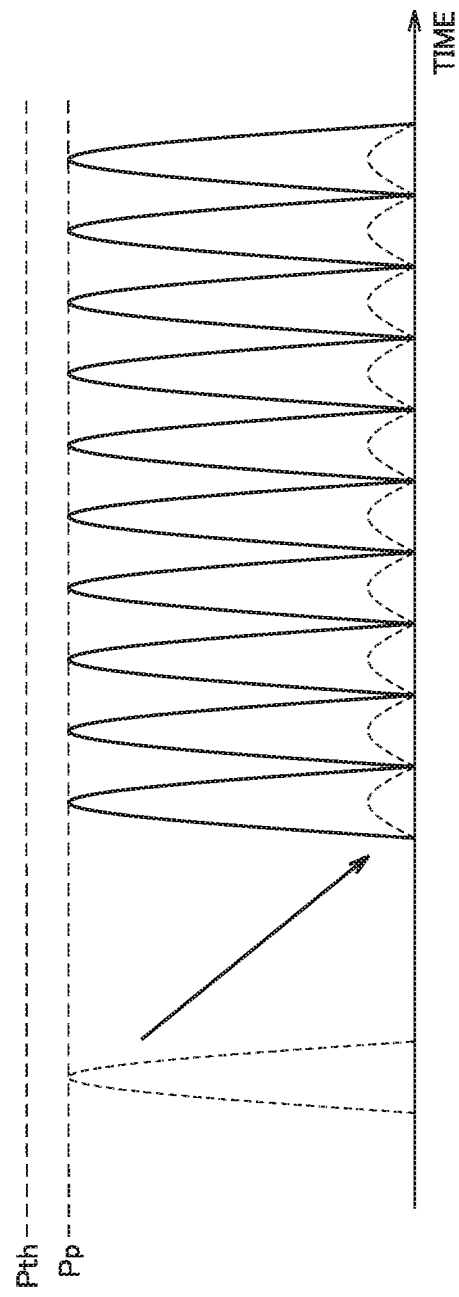
FIG. 5 is a waveform diagram for illustrating variation of peak power when the laser processing device according to the present embodiment increases a pulse width in a second mode.

FIG. 5 is a waveform diagram for illustrating variation of peak power Pp when laser processing device 100 according to the present embodiment increases a pulse width in the second mode. With reference to FIG. 5, a waveform indicated by a solid line represents the power of a laser pulse output from laser processing device 100 in the second mode. A waveform indicated by a dotted line represents the power of a laser pulse output from laser processing device 100 in the first mode. In the second mode, the laser pulse's pulse width w is increased to be larger than a minimum pulse width, and peak power Pp is increased within threshold value power Pth. This can increase the average power, and processing such as deep metal penetration or black marking can be done for example.

In the second mode, repetition frequency f has a setting range narrower than that of the repetition frequency in the first mode, and pulse width w also has a setting range narrower than that of the pulse width in the first mode. Specifically, in the second mode, the setting range of repetition frequency f has an upper limit value smaller than that of the setting range of the repetition frequency in the first mode. In other words, in the second mode, the repetition frequency can be set within a low frequency region. This allows peak power to be increased. Furthermore, in the second mode, pulse width w has a lower limit value larger than a minimum value of the pulse width. This can reduce a possibility that peak power Pp exceeds threshold value power Pth.

Furthermore, pulse width w has a maximum value larger than that of the pulse width in the first mode. Thus, a laser pulse of high power suitable for processing, such as deep metal penetration or black marking, can be output.

FIG. 6 is a waveform diagram showing an example of a waveform of a laser pulse when laser processing device 100 according to the present embodiment is operated in the first mode and the second mode. With reference to FIG. 6, the two graphs have equal scales for an axis of ordinate representing power and equal scales for an axis of abscissa representing time. In the second mode, peak energy can be made higher than in the first mode. In the example shown in FIG. 6, in the second mode, a pulse train is shown which has an initial pulse with particularly high peak power. Such a pulse waveform allows large contribution to deep metal penetration.

FIG. 7 shows an example of a set pattern for operating laser processing device 100 according to the present embodiment in each of the first mode and the second mode. With reference to FIG. 7, for example in the first mode, the user can select a pattern suitable for a condition for processing from 15 set patterns which laser processing device 100 stores. In contrast, in the second mode, the user can select a pattern suitable for a condition for processing from 3 set patterns which laser processing device 100 stores. In the set patterns in the second mode, the number of pulses settable, i.e., the setting range of the pulse width is limited more than in the set patterns in the first mode.

A maximum value of the pulse width in the second mode is larger than that of the pulse width in the first mode. In other words, in the second mode, a maximum value of the number of pulses settable is 30, whereas in the first mode, a maximum value of the number of pulses settable is 20.

<D. Setting a Mode>

Figure 8:
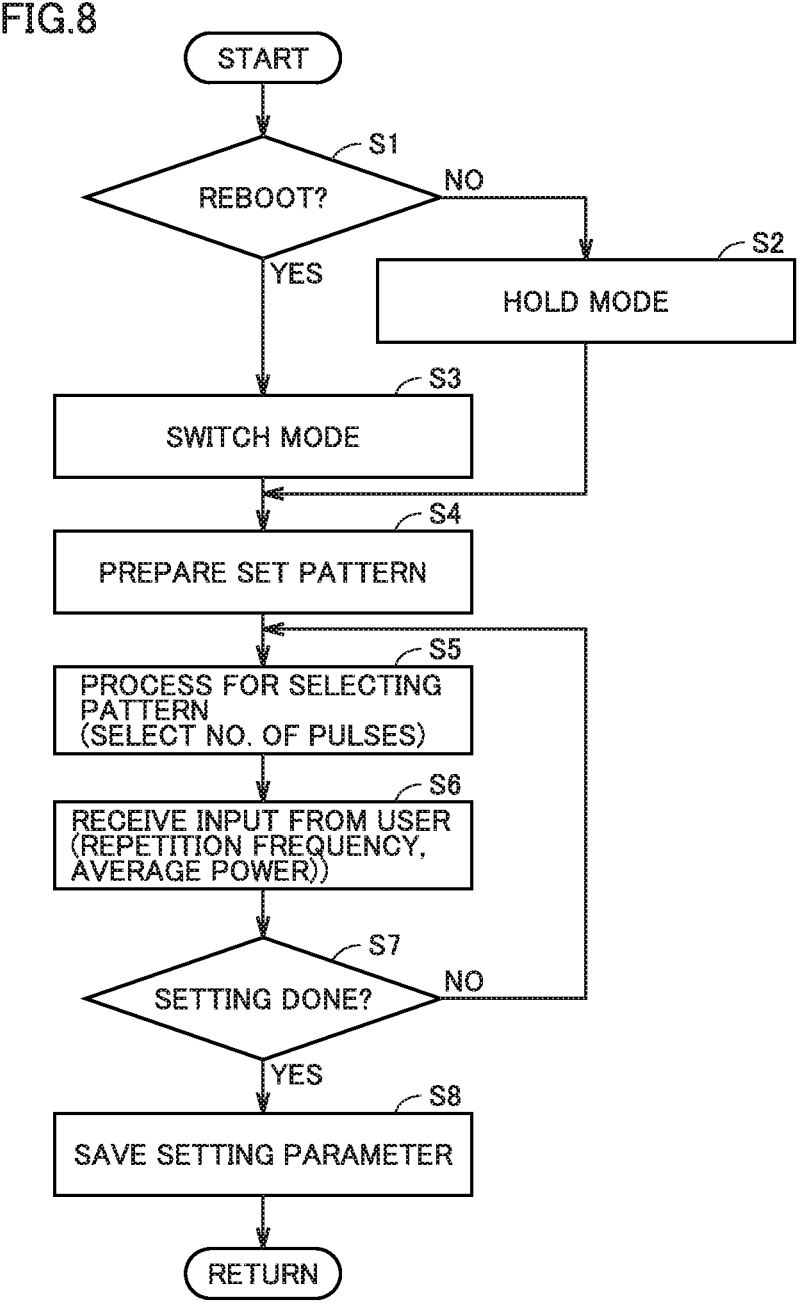
FIG. 8 is a flowchart for illustrating a setting process of the laser processing device according to the present embodiment.

FIG. 8 is a flowchart for illustrating a setting process of laser processing device 100 according to the present embodiment. The process indicated in this flowchart is mainly performed by control unit 20. With reference to FIG. 8, in step S1, control unit 20 determines whether a process for rebooting laser processing device 100 has been performed. When the reboot process is not performed (NO in step S1), the current mode (the first mode or the second mode) is held (step S2). In contrast, when the reboot process is performed (YES in step S1), control unit 20 switches the mode (step S3).

Following step S2 or step S3, in step S4, control unit 20 prepares a set pattern corresponding to the current mode (see FIG. 7). For example, control unit 20 reads a set pattern stored therein.

In step S5, control unit 20 performs a process to cause the user to select a pattern for setting each of the first mode and the second mode from a plurality of set patterns. For example, setting device 301 operates in response to an instruction received from control unit 20 to prepare an input screen for the user to input a pulse width etc. The user can select a pulse width (a number of pulses) via the input screen. A parameter input to setting device 301 is sent from setting device 301 to control unit 20. An example of the input screen will specifically be described hereinafter.

In step S6, control unit 20 receives the input (a setting parameter) from the user via setting device 301. The setting parameter is a repetition frequency, an average power, etc., for example. For the sake of illustration, while in FIG. 8 the process in which control unit 20 receives a setting done by the user is described as being divided into step S5 and step S6, the process in which control unit 20 receives the setting done by the user may be performed in one step. Furthermore, the plurality of set patterns is not limited to the pulse width's patterns, and may be the repetition frequency's set patterns or set patterns of the pulse width and the repetition frequency combined together.

In step S7, control unit 20 determines whether the user's setting has been completed. For example, when the user indicates to setting device 301 that a setting has been completed, the indication is sent from setting device 301 to control unit 20.

Thus control unit 20 determines that the user's setting has been completed. In that case (YES in step S7) control unit 20 stores a parameter set by the user. The stored parameter is used when laser processing device 100 operates. In contrast, when control unit 20 determines that the user's setting has not yet been completed (NO in step S7), the process returns to step S5 and the user's setting process is continued.

<E. User Interface>

In the following description of a user interface, the first mode and the second mode will be referred to as a "standard mode" and an "EE mode", respectively. It should be noted that these names are not intended to limit the present embodiment.

Figure 9:
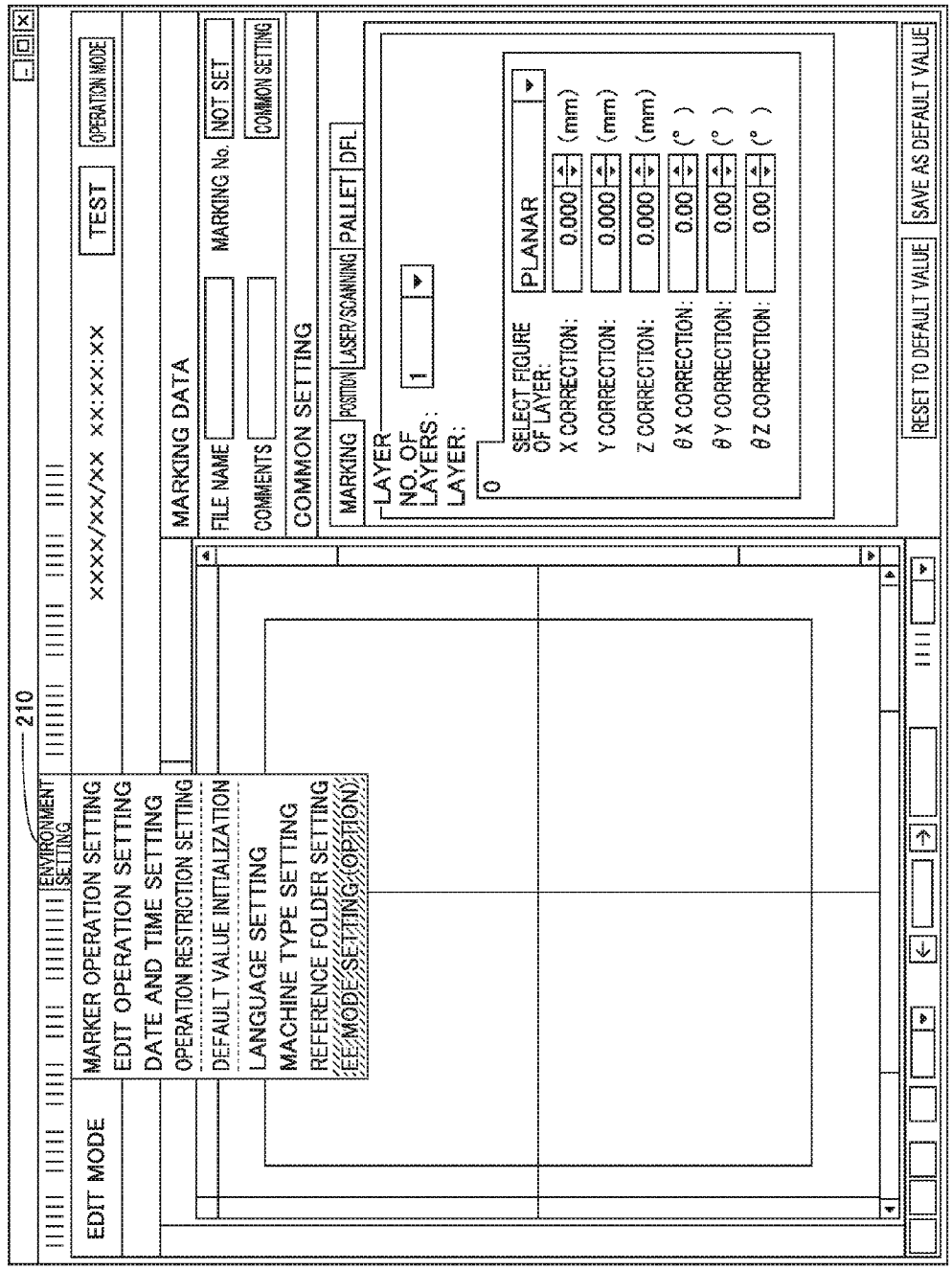
FIG. 9 is a schematic diagram showing an example of a user interface screen for setting a mode of the laser processing device according to the present embodiment.

FIG. 9 is a schematic diagram showing an example of a user interface screen for setting a mode of the laser processing device according to the present embodiment. With reference to FIG. 9, when setting a mode of laser processing device 100, the user selects an "environment setting" menu (reference numeral: 210) from a menu list. This allows "EE mode setting (option)" to be selectable, and the user selects "EE mode setting (option)" for example by clicking the mouse. This displays a dialog for selecting a mode from the standard mode and the EE mode.

Figure 10:
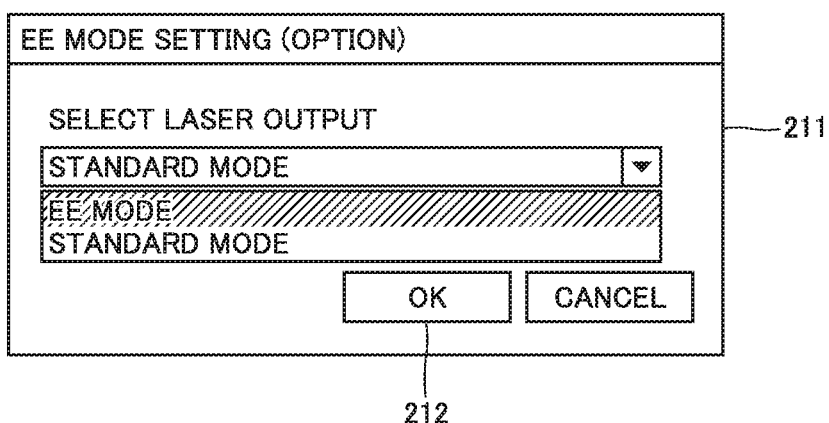
FIG. 10 is a schematic diagram showing an example of a dialog for selecting a mode.

FIG. 10 is a schematic diagram showing an example of a dialog for selecting a mode. With reference to FIG. 10, the user selects the EE mode or the standard mode via a dialog 211 and presses an OK button 212. This reboots laser processing device 100 and switches a mode. In other words, step S1 and step S3 shown in FIG. 8 are performed.

Figure 11:
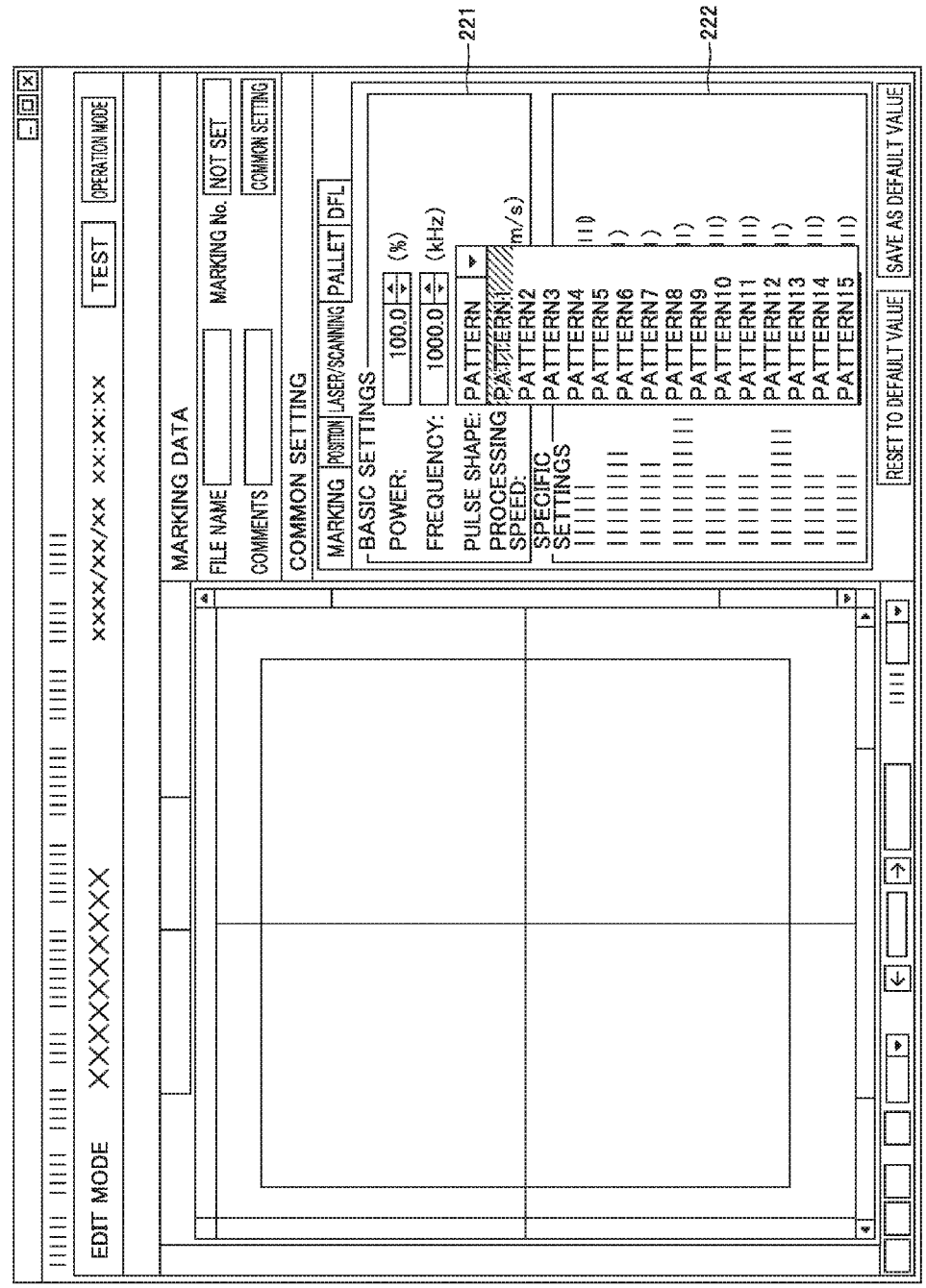
FIG. 11 is a schematic diagram showing an example of a setting screen for a standard mode (a first mode).

FIG. 11 is a schematic diagram showing an example of a setting screen for the standard mode (the first mode). With reference to FIG. 11, "Basic Setting" (reference numeral: 221) and "Detail Settings" (reference numeral: 222) are fields for setting parameters. The laser pulse's power, repetition frequency (in FIG. 11, it is indicated as "frequency"), the pulse's shape (corresponding to the pulse width), and processing speed are basic setting parameters. In the standard mode, the repetition frequency can be set for example within a range of 10.0 kHz to 1000.0 kHz. The pulse's shape can be selected from pattern 1 to pattern 15.

Figure 12:
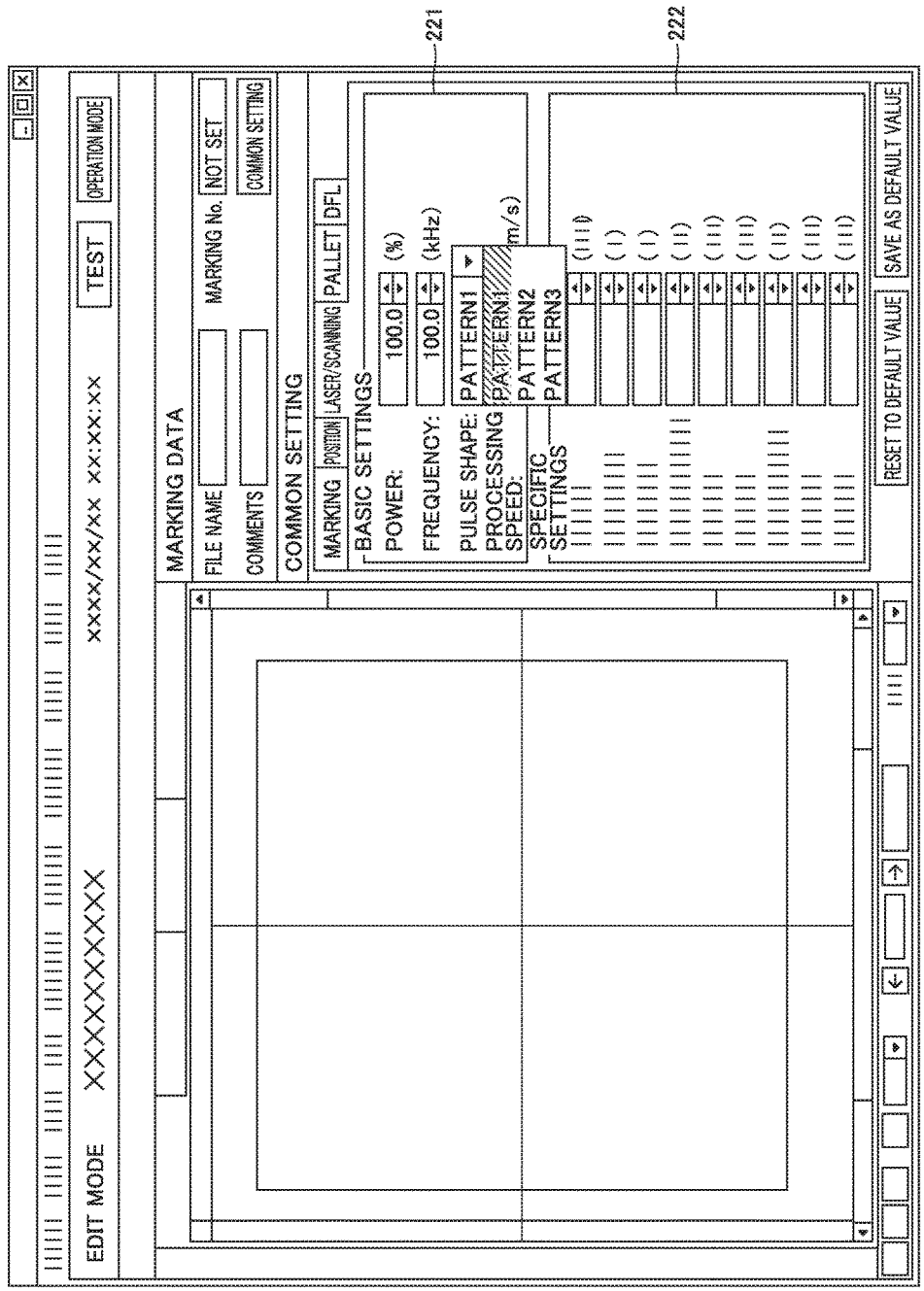
FIG. 12 is a schematic diagram showing an example of a setting screen for an EE mode (a second mode).

FIG. 12 is a schematic diagram showing an example of a setting screen for the EE mode (the second mode). With reference to FIG. 12, in the EE mode, the repetition frequency can be set within a range of 10.0 kHz to 100.0 kHz. The pulse's shape can be selected from pattern 1 to pattern 3.

In each of the standard mode and the EE mode, patterns and numbers of pulses are associated as shown in FIG. 7 and stored in control unit 20. When the user inputs a parameter via the setting screen shown in FIG. 11 or FIG. 12, steps S5 and S6 shown in FIG. 7 are performed.

<F. Laser Characteristics>

Figure 13:
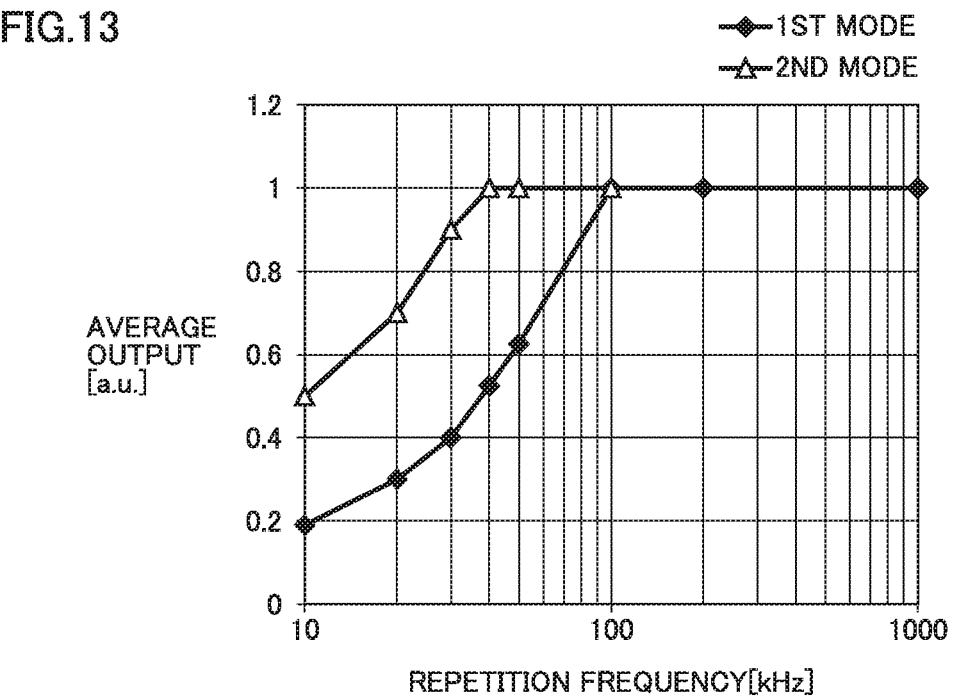
FIG. 13 is a graph representing an average power of an output when the laser processing device according to the present embodiment is operated in the first mode and the second mode.
Figure 14:
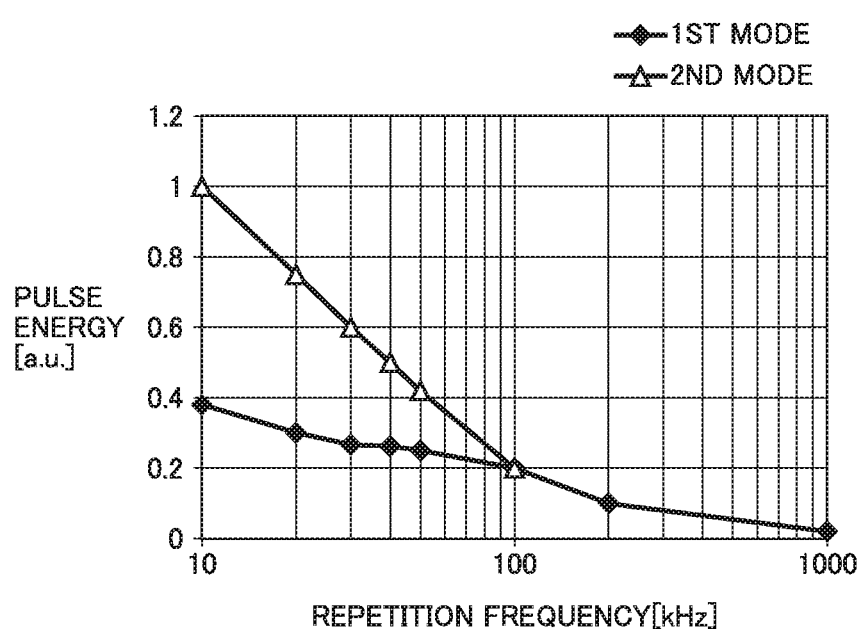
FIG. 14 is a graph representing pulse energy when the laser processing device according to the present embodiment is operated in the first mode and the second mode.
Figure 15:
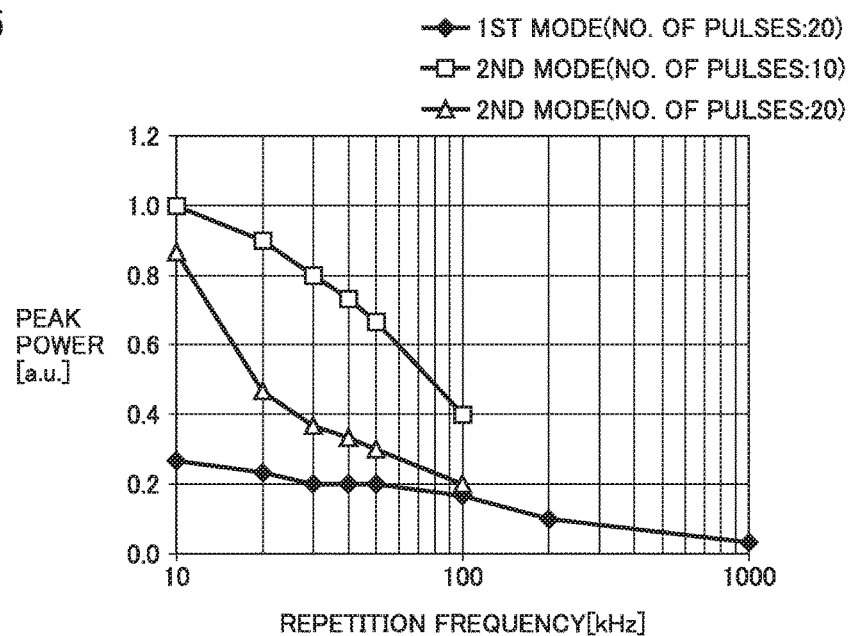
FIG. 15 is a graph representing peak power when the laser processing device according to the present embodiment is operated in the first mode and the second mode.

An example of laser characteristics when laser processing device 100 according to the present embodiment is operated is shown in FIG. 13 to FIG. 16. FIG. 13 is a graph representing an average power of an output when laser processing device 100 according to the present embodiment is operated in each of the first mode and the second mode. FIG. 14 is a graph representing pulse energy when laser processing device 100 according to the present embodiment is operated in each of the first mode and the second mode. FIG. 15 is a graph representing peak power when laser processing device 100 according to the present embodiment is operated in each of the first mode and the second mode.

In FIG. 13 to FIG. 15, each graph's axis of ordinate represents a numerical value when a characteristic value in the second mode is standardized as 1. Furthermore, in FIG. 13 and FIG. 14, for both the first mode and the second mode, a laser characteristic when the number of pulses (see FIG. 7) is 20 is indicated. In FIG. 15, for both the first mode and the second mode, a peak power when the number of pulses (see FIG. 7) is 20 and in addition, a peak power in the second mode when the number of pulses (see FIG. 7) is 10 are indicated.

As shown in FIG. 13 to FIG. 15, for a repetition frequency of 100 kHz or less, laser processing device 100 has an average output, a pulse energy, and a peak power all higher in the second mode than in the first mode. Furthermore, in the second mode, the peak power for 10 pulses is higher than that for 20 pulses. That is, the smaller the pulse width is, the larger the peak power is.

Thus laser processing device 100 according to the present embodiment has a mode (the second mode) in which excitation light's power is controlled so that as a set value of the pulse width of amplified light (or the number of pulses) increases, the amplified light's peak energy increases within a threshold value at a minimum set value of the pulse width. This allows the fiber laser oscillator to output a laser pulse of higher average power.

Figure 16:
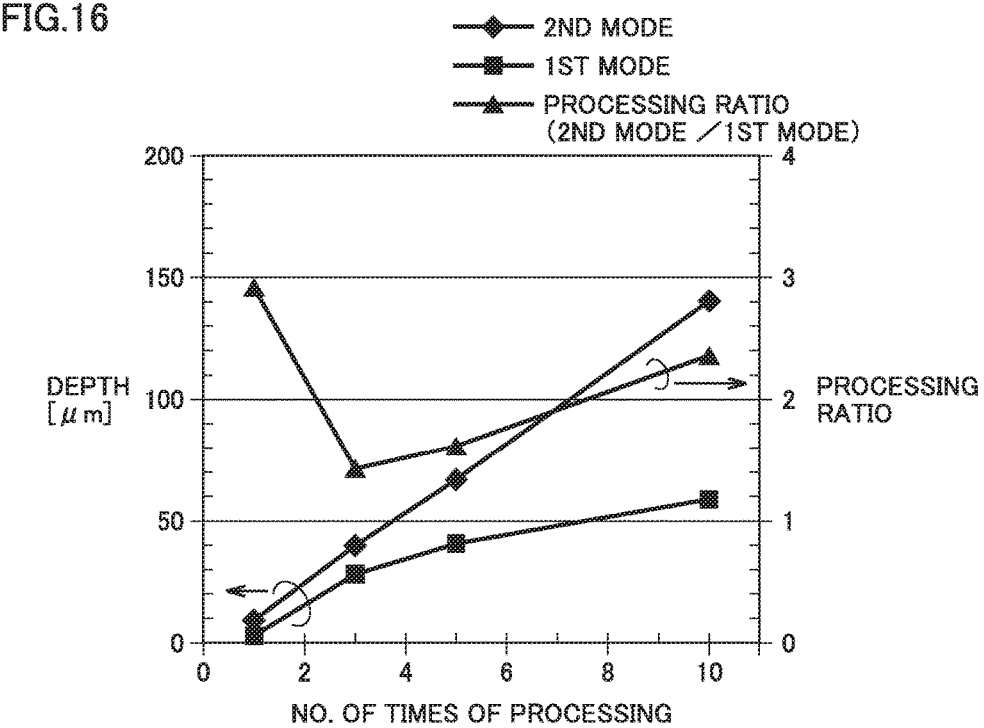
FIG. 16 is a figure for illustrating an effect of deep metal penetration in the second mode.

FIG. 16 is a figure for illustrating an effect of deep metal penetration in the second mode. A metal of aluminum is used. As shown in FIG. 16, when the second mode is compared with the first mode, the former allows a larger processing depth from a surface of the metal relative to how many times the processing is done. Accordingly, a processing ratio (a processing depth in the second mode/a processing depth in the first mode) is larger than one and increases as the processing is done more times. FIG. 16 shows that deep metal penetration can be implemented in the second mode.

<G. Exemplary Variation>

In the embodiment disclosed above, switching between the two modes of the first mode and the second mode is described. In another embodiment, when the second mode is set from the first mode, control unit 20 may operate in response to an input (a user input) received from a user interface for varying an upper limit of repetition frequency f of amplified light stepwise or smoothly to increase a pulse width to be larger than that in the first mode and also increase excitation light's power to be larger than that in the first mode. Control unit 20 may increase the pulse width and the excitation light's power stepwise or smoothly.

Furthermore, in another embodiment, when the second mode is set from the first mode, control unit 20 may operate in response to an input received from the user interface for varying a pulse width stepwise or smoothly to increase excitation light's power to be larger than that in the first mode stepwise or smoothly and also decrease the repetition frequency's upper limit to be smaller than that in the first mode stepwise or smoothly.

In still another embodiment, when the second mode is set from the first mode, control unit 20 may operate in response to an input received from the user interface for varying amplified light's power stepwise or smoothly to increase a pulse width to be larger than that in the first mode stepwise or smoothly and also decrease the repetition frequency's upper limit to be smaller than that in another mode stepwise or smoothly.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. A light amplification device comprising:
   a seed light source configured to generate a pulsing seed light;
   an excitation light source configured to generate excitation light;
   a light amplifying fiber configured to amplify the seed light by the excitation light and output the amplified light; and
   a control unit configured to control the seed light source and the excitation light source,
   the control unit having a mode to control the excitation light's power such that during a period when the seed light source repeatedly generates the seed light, as a set value of a pulse width of the amplified light increases, the amplified light's peak energy increases within a threshold value at a minimum set value of the pulse width.

2. The light amplification device according to claim 1, wherein:
   when the mode is set, the control unit decreases an upper limit of a repetition frequency of the amplified light to be smaller than an upper limit of the repetition frequency in another mode different from the mode, and also sets the pulse width to be larger than the minimum set value; and
   the control unit increases the power of the excitation light generated by the excitation light source to be larger than the power of the excitation light in the other mode.

3. The light amplification device according to claim 2, wherein the control unit increases an average power of the amplified light in the mode to be higher than the average power in the other mode.

4. The light amplification device according to claim 2, wherein a maximum value of the pulse width in the mode is larger than a maximum value of the pulse width in the other mode.

5. The light amplification device according to claim 4, wherein when the control unit increases the pulse width, the control unit controls the seed light source to emit the seed light as a pulse train including a plurality of light pulses.

6. The light amplification device according to claim 5, wherein the control unit performs a process to cause a user to select a pattern for setting each of the mode and the other mode from a plurality of set patterns for determining a number of the light pulses configuring the pulse train.

7. The light amplification device according to claim 2, wherein the control unit performs a process to cause a user to select a pattern for setting each of the mode and the other mode from a plurality of set patterns for determining the repetition frequency.

8. The light amplification device according to claim 2, wherein the control unit switches the mode to the other mode and vice versa by a reboot process.

9. The light amplification device according to claim 1, wherein when the mode is set from another mode different from the mode, the control unit operates in response to an input received from a user for decreasing an upper limit of a repetition frequency of the amplified light to increase the pulse width to be larger than a pulse width in the other mode and also increase the excitation light's power to be larger than the excitation light's power in the other mode.

10. The light amplification device according to claim 1, wherein when the mode is set from another mode different from the mode, the control unit operates in response to an input received from a user for increasing the pulse width to increase the excitation light's power to be larger than the excitation light's power in the other mode and also decrease an upper limit of a repetition frequency to be smaller than an upper limit of the repetition frequency in the other mode.

11. The light amplification device according to claim 1, wherein when the mode is set from another mode different from the mode, the control unit operates in response to an input received from a user for increasing the excitation light's power to increase the pulse width to be larger than a pulse width in the other mode and also decrease an upper limit of a repetition frequency to be smaller than an upper limit of the repetition frequency in the other mode.

12. A laser processing device comprising:
   a seed light source configured to generate a pulsing seed light;
   an excitation light source configured to generate excitation light;
   a light amplifying fiber configured to amplify the seed light by the excitation light and output the amplified light; and
   a control unit configured to control the seed light source and the excitation light source,
   the control unit having a mode to control the excitation light's power such that during a period when the seed light source repeatedly generates the seed light, as a set value of a pulse width of the amplified light increases, the amplified light's peak energy increases within a threshold value at a minimum set value of the pulse width.

* * * * *